No. 716,278. Patented Dec. 16, 1902.
H. G. REIST.
COOLING DYNAMO ELECTRIC MACHINES.
(Application filed June 26, 1901.)
(No Model.) 3 Sheets—Sheet 1.

Witnesses:
Robt C. Chapman
Benjamin B. Hull

Inventor:
Henry G. Reist.
by Albert G. Davis
Atty.

No. 716,278. Patented Dec. 16, 1902.
H. G. REIST.
COOLING DYNAMO ELECTRIC MACHINES.
(Application filed June 26, 1901.)
(No Model.) 3 Sheets—Sheet 2.
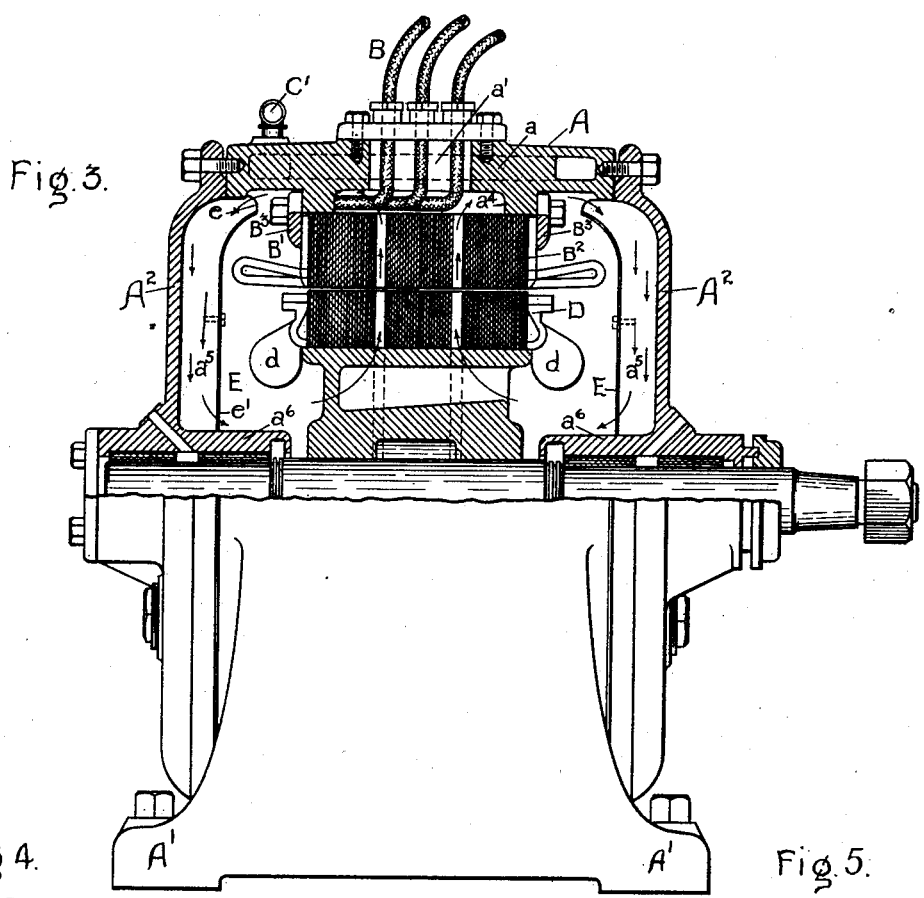
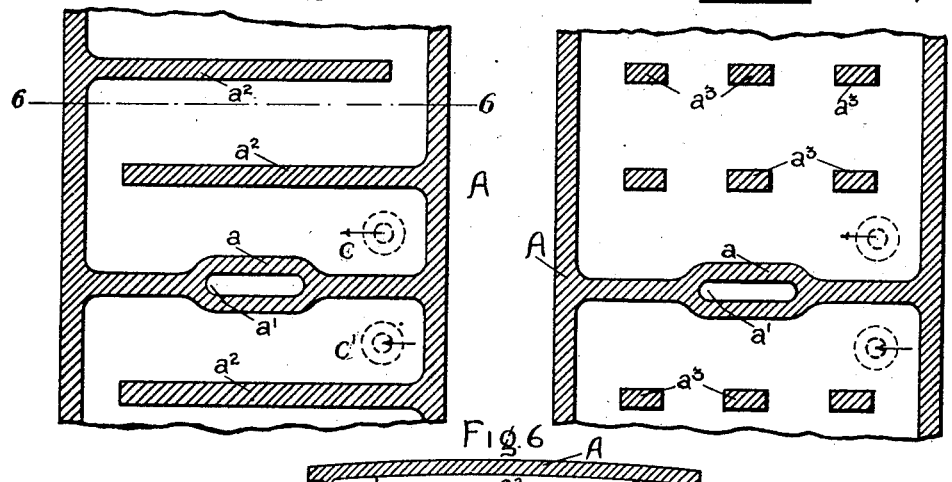
Witnesses:
Rob't C. Chapman
Benjamin B. Hull
Inventor:
Henry G. Reist.
by Albert G. Davis
Atty.

No. 716,278. Patented Dec. 16, 1902.
H. G. REIST.
COOLING DYNAMO ELECTRIC MACHINES.
(Application filed June 26, 1901.)
(No Model.) 3 Sheets—Sheet 3.

Witnesses:
Rob't C. Chapman
Benjamin B. Hull

Inventor:
Henry G. Reist.
by Albert G. Davis
Atty.

THE NORRIS PETERS CO., PHOTO-LITHO., WASHINGTON, D. C.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

COOLING DYNAMO-ELECTRIC MACHINES.

SPECIFICATION forming part of Letters Patent No. 716,278, dated December 16, 1902.

Application filed June 26, 1901. Serial No. 66,071. (No model.)

*To all whom it may concern:*

Be it known that I, HENRY G. REIST, a citizen of the United States, residing at Schenectady, county of Schenectady, State of New York, have invented certain new and useful Improvements in Cooling Dynamo-Electric Machines, of which the following is a specification.

This invention relates to dynamo-electric machines; and its object is to provide novel and convenient means for cooling the same.

The invention is especially applicable to motors, such as induction-motors, which in certain situations have to be inclosed in water-tight casings, and are thus liable to heat up to a dangerous temperature; but I do not confine the invention to any particular class of dynamo-electric machines, since it is applicable to all in which the frame can be made hollow, the gist of the invention being means for causing a continuous circulation of the air inside the casing and means for cooling a portion of said casing, so as to lower the temperature of the air as it passes in contact with said cooled portion. To effect this, I prefer to provide the frame of the machine with an internal continuous chamber and force a cooling fluid, such as water, through said chamber, whereby the air in contact with the inside of the frame will be cooled by conduction.

Figure 1:
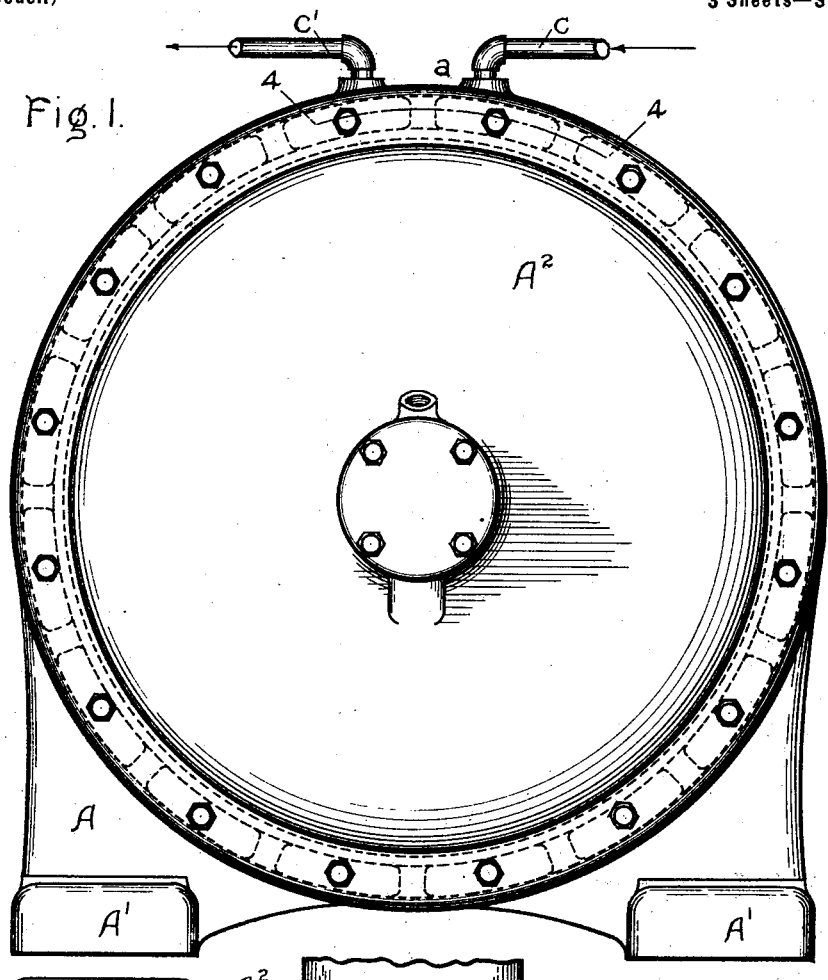
Figure 2:
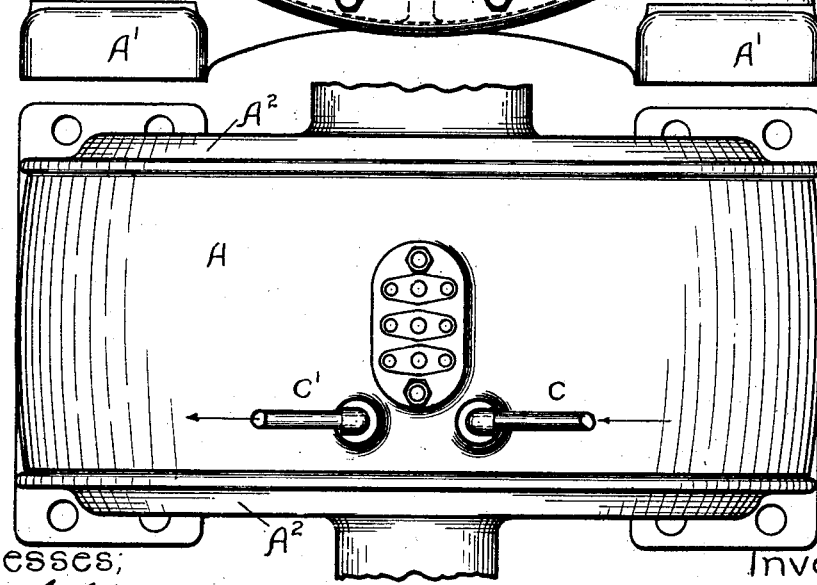
Figure 7:
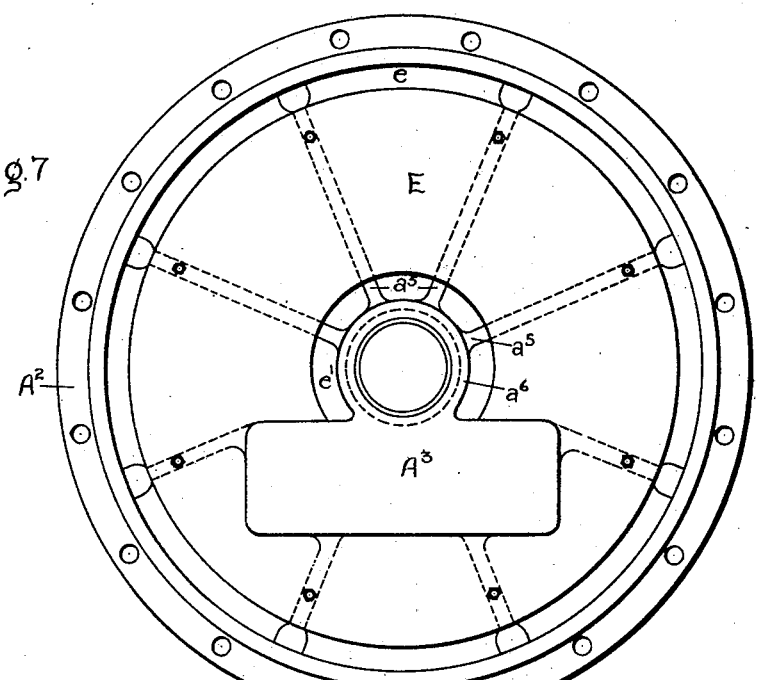
Figure 8:
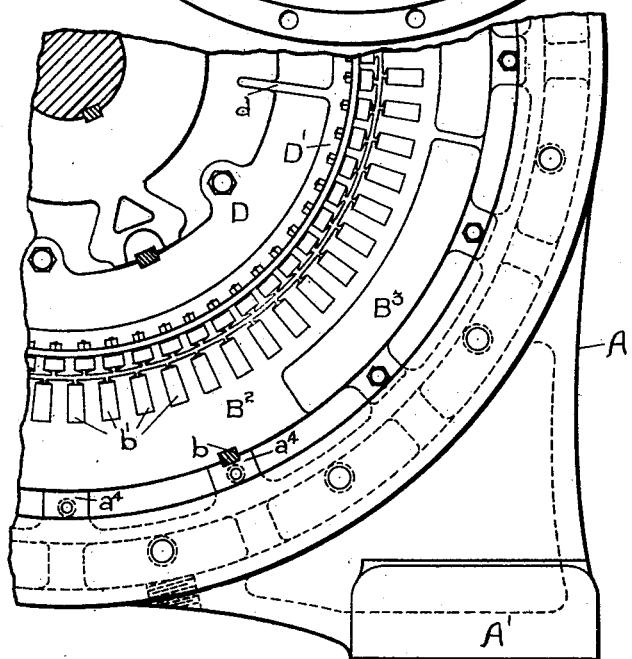

In the accompanying drawings, Figure 1 is an end view of an induction-motor embodying my invention. Fig. 2 is a top plan view of the same. Fig. 3 is a side elevation with the upper half in section. Fig. 4 is a lengthwise section of the tubular frame on the line 4 4, Fig. 1. Fig. 5 is a modification. Fig. 6 is a cross-section of the frame on the line 6 6, Fig. 4. Fig. 7 is an inside elevation of one of the heads and its partition. Fig. 8 is a partial end view with the head of the casing removed.

The stationary frame A of the machine is a hollow annulus, preferably substantially rectangular in cross-section and supported in any usual manner, as by tangent feet $A'$, cast integral with the frame. At some point in the frame, preferably at the upper side, is a partition or septum $a$, through which, if desired, may be formed a passage $a'$ for leading out the terminals B of the field-winding $B'$ of the machine. On each side of the partition $a$ a pipe C $C'$ is tapped through the wall of the hollow frame. If water or the like is conveyed through one of said pipes, as C, into the frame, it must flow through the entire length thereof before it reaches the escape-pipe $C'$. If it is desired to effect a slow circulation of the cooling agent, the interior of the frame may be provided with baffle-plates, such as partitions $a^2$, projecting alternately from each side of the frame and terminating short of the opposite side, as shown in Fig. 4, or cross-bars $a^3$, spanning the inside of the frame and set near together, as shown in Fig. 5. These plates and bars are preferably cast integral with the frame.

The laminated core $B^2$ for the field-winding is supported on bosses $a^4$, projecting radially inward from the frame and leaving an annular space between the core and said frame. The laminations and one of the bosses have a keyway for a key $b$, which retains the slots $b'$ in line, and the core is clamped in place by end plates $B^3$, having lugs by which they can be bolted to the bosses. The heads $A^2$ of the casing are fastened to the frame, so as to form an air-tight chamber for the field-windings $B'$ and the armature D. The usual rotary fan-blower action of the armature may be assisted by radial fan-blades $d$, projecting from the connecting-rings $D'$ of the armature. A thin partition E is located near each end of the casing and preferably parallel with the heads $A^2$, being secured to radial ribs $a^5$ on the inside of the heads. An annular opening $e$ is left between the outer edge of the partition and the frame and another opening $e'$ between its inner edge and the journal-box $a^6$ at the center of the head $A^2$. The partition fits closely against the ends and bottom of the oil-cellar $A^3$ under said journal-box.

The operation of the invention is as follows: The rotation of the armature causes a flow of air outwardly through the space between the sections of the armature-core and field-core into the annular space between the field-core and the frame, thence along the inner surface of the frame and through the opening $e$ into the radial spaces between the heads of the casing and the partitions E, thence inwardly toward the armature-shaft, and back into the interior of the casing through the opening $e'$. Meanwhile cold water has been flowing through the tubular frame and cooling the inner surface thereof, so that the current of air passing in contact with it is lowered in temperature, the heat passing off with the waste water through the pipe $C'$.

It is evident that the radial fan-blades $d$ and the partitions E may be omitted, if desired; but I prefer to use them in order to obtain more rapid and effective cooling, since the passage of the air in contact with the heads $A^2$ tends to assist in lowering its temperature.

What I claim as new, and desire to secure by Letters Patent of the United States, is—

1. A dynamo-electric machine having a tubular frame provided with internal cross-pieces not entirely obstructing the passage-way through said frame.

2. A dynamo-electric machine having a tubular frame provided with internal integral baffle-plates.

3. A dynamo-electric machine having a tubular frame provided with internal baffle-plates, a partition extending entirely across it at one point, and pipes entering said frame on each side of said partition.

4. A dynamo-electric machine having an annular space between the field-core and the frame, with lateral openings, means for effecting a circulation of air through said space, and means for cooling the frame adjacent to said space.

5. A dynamo-electric machine having internal bosses on its field-frame, a field-core supported on said bosses, means for circulating air through said core, and means for cooling the frame.

6. A dynamo-electric machine having a tubular frame, means for circulating a cooling fluid through said frame, heads fitting the ends of said frame, and partitions near to said heads and having openings at the outer and inner edges.

7. A dynamo-electric machine having casing-heads provided with radial ribs, thin partitions secured to said ribs with openings at the outer and inner edges, and means for causing the air in the casing to flow radially inward between the heads and the partitions.

8. In an incased dynamo-electric machine, means for causing the air in the casing to flow outwardly through the armature and field cores and inwardly along the inside of the casing-heads, and means for cooling the air at some point in its passage.

9. In an incased dynamo-electric machine having a tubular frame, means for causing the air in the casing to flow outwardly through the armature and field cores and inwardly along the inside of the casing-heads, and means for circulating a cooling fluid through said tubular frame.

10. In an incased dynamo-electric machine, means for causing a systematic circulation of the air in said casing, and means for cooling said air at some point in its passage.

In witness whereof I have hereunto set my hand this 24th day of June, 1901.

HENRY G. REIST.

Witnesses:
BENJAMIN B. HULL,
MARGARET E. WOOLLEY.